(12) United States Patent
Wegmann

(10) Patent No.: US 10,393,928 B2
(45) Date of Patent: Aug. 27, 2019

(54) BANDS OF RETROREFLECTIVE TARGETS AND METHODS OF MAKING SAME

(71) Applicant: Mark Wegmann, Chesterfield, MO (US)

(72) Inventor: Mark Wegmann, Chesterfield, MO (US)

( * ) Notice: Subject to any disclaimer, the term of this patent is extended or adjusted under 35 U.S.C. 154(b) by 401 days.

(21) Appl. No.: 15/140,068

(22) Filed: Apr. 27, 2016

(65) Prior Publication Data

US 2016/0320535 A1    Nov. 3, 2016

Related U.S. Application Data

(60) Provisional application No. 62/155,117, filed on Apr. 30, 2015.

(51) Int. Cl.
| G02B 5/124 | (2006.01) |
| G02B 5/136 | (2006.01) |
| B26F 1/18  | (2006.01) |
| B26D 7/18  | (2006.01) |
| B26F 1/38  | (2006.01) |
| G01C 11/00 | (2006.01) |

(52) U.S. Cl.
CPC .............. *G02B 5/136* (2013.01); *B26D 7/18* (2013.01); *B26F 1/18* (2013.01); *B26F 1/3846* (2013.01); *G01C 11/00* (2013.01)

(58) Field of Classification Search
CPC ........ G02B 5/122; G02B 5/124; G02B 5/128; G02B 5/136; B26D 7/18; B26F 1/18; B26F 1/3846
USPC ......................................................... 359/530
See application file for complete search history.

(56) References Cited

U.S. PATENT DOCUMENTS

| 4,950,525   | A  * | 8/1990  | Bailey ................. G02B 5/128  |
|             |      |         | 156/276                              |
| 6,247,818   | B1 * | 6/2001  | Hedblom ......... B29D 11/00615     |
|             |      |         | 359/539                              |
| 6,548,164   | B1 * | 4/2003  | Bacon, Jr. ............ G02B 5/124  |
|             |      |         | 428/343                              |
| 2009/0240372 | A1 * | 9/2009 | Bordyn ................. B25J 9/1692 |
|             |      |         | 700/259                              |
| 2014/0340750 | A1 * | 11/2014 | Neal ..................... G02B 5/122 |
|             |      |         | 359/529                              |

* cited by examiner

*Primary Examiner* — Euncha P Cherry
(74) *Attorney, Agent, or Firm* — Armstrong Teasdale LLP

(57) ABSTRACT

This disclosure relates generally to photogrammetry, and, more particularly, to retroreflective targets used in photogrammetry for measurement of objects being photographed.

20 Claims, 5 Drawing Sheets

BANDS OF RETROREFLECTIVE TARGETS AND METHODS OF MAKING SAME

CROSS-REFERENCE TO RELATED APPLICATIONS

This application claims priority benefit of U.S. Provisional Patent Application No. 62/155,117, filed Apr. 30, 2015, the entire contents and disclosure of which are hereby incorporated by reference in their entirety.

FIELD OF THE DISCLOSURE

This disclosure relates generally to photogrammetry, and, more particularly, to retroreflective targets used in photogrammetry for measurement of objects being photographed.

BACKGROUND OF THE DISCLOSURE

Photogrammetry is the practice of determining geometric properties of objects from photographic images. Photogrammetry is frequently used in the modelling of 3-dimensional (3D) objects from 2-dimensional (2D) photographs. By taking multiple photographs of an object from different angles and/or different positions, "lines of sight" from the camera to different features or points on the object can be determined. Mathematical intersections of these lines of sight are subsequently used to determine, in a process known as triangulation, the 3D coordinates of those features of the object.

The relative success of photogrammetric measurement typically depends on a number of factors, including the quality and resolution of the camera taking the photos, the size of the object being photographed and subsequently measured, the number of photos taken of the object, and how the photos are oriented relative to each other and to the object. Moreover, successful measurement also depends on elements such as the visibility of key features of the object, as well as how well the features are targeted. Precise targeting enhances the accuracy of photogrammetric measurements.

In at least some cases, targeting is performed using retroreflective targets. Generally, these retroreflective targets are small pieces of highly reflective material that reflect light back to its source with minimal scattering. In some embodiments, the retroreflective material is as much as 100 to 1000 times more efficient than a white (non-retroreflective) target. Accordingly, only a low-power flash is necessary to illuminate the targets. The targets in the photograph are very bright and, thus, are easy to locate and measure. At least some known targets are manufactured with an adhesive backing layer so that the targets are adhered or placed upon key features of the object being photographed. Targets are placed individually on the features, and measurements are taken by hand or computed between adjacent targets. However, this leaves room for computer and/or human error. Accordingly, at least some retroreflective targets are manufactured on a band, in which the targets are attached to a matte black tape and are equidistant from each other, further enhancing the precision of the targets and, thus, the accuracy of the photogrammetric measurements. However, at least some known systems provide a band of retroreflective targets that may induce poor performance due to interference from the raised sides of the target.

A need exists, therefore, for bands including retroreflective targets that overcome the failures of the prior art and lead to improved performance through, for example, improved tolerance of the targets.

BRIEF DESCRIPTION OF THE DRAWINGS

Like reference symbols in the various drawings indicate like elements.

SUMMARY OF THE DISCLOSURE

Figure 1:
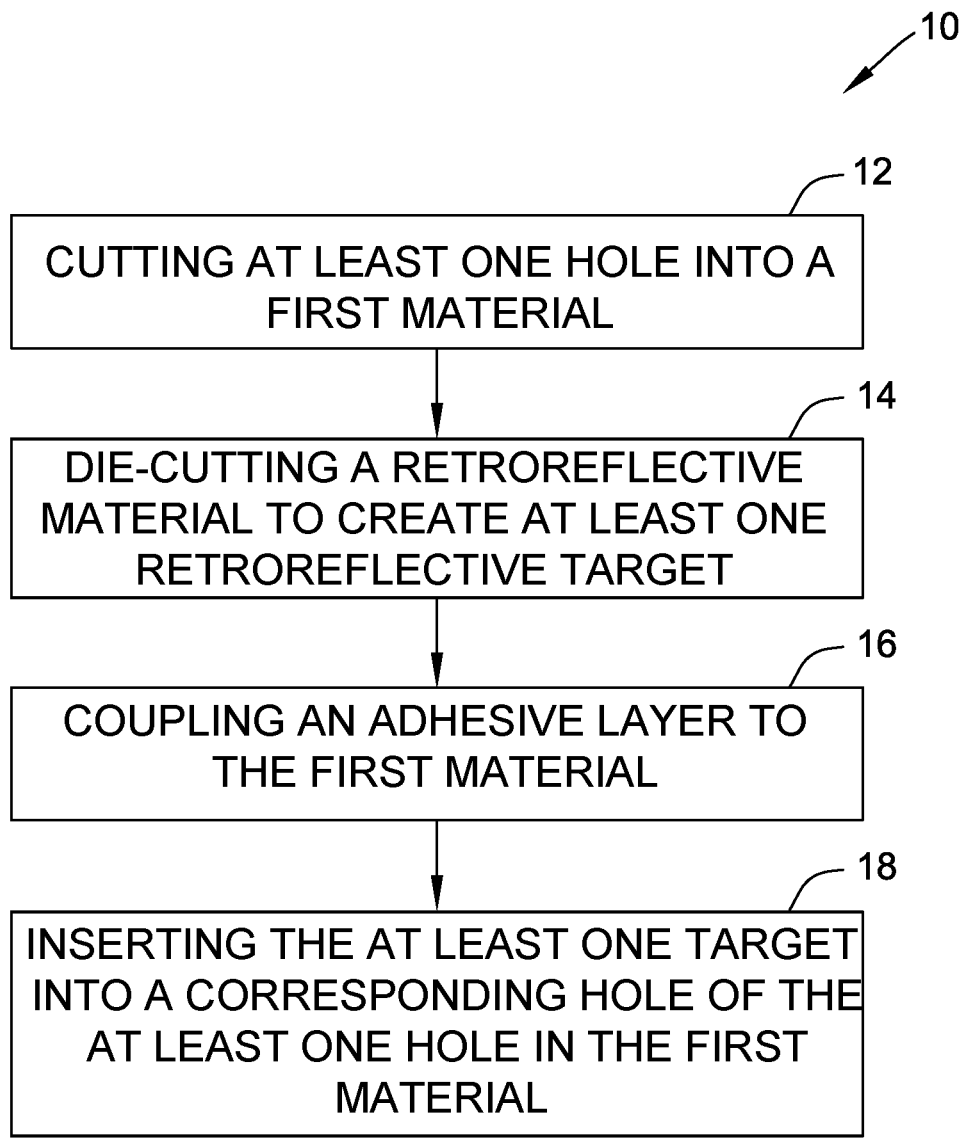
FIG. 1 is a flow-chart of a first exemplary method for producing a band of retroreflective targets in accordance with the present disclosure.

In some embodiments of the present disclosure, a method for producing a band of retroreflective targets is provided. The method includes cutting at least one hole into a first material, die-cutting a retroreflective material to create at least one retroreflective target, coupling an adhesive layer to the first material, and inserting the at least one target into a corresponding hole of the at least one hole in the first material.

In other embodiments of the present disclosure, a band of retroreflective targets is provided. The band of retroreflective targets includes a first material having a first depth, the first material including at least one hole defined therein. The band also includes at least one retroreflective target having a second depth, wherein the second depth is equal to or substantially the same as the first depth. Each of the at least one retroreflective targets is disposed within a corresponding hole of the at least one hole in the first material.

In other embodiments of the present disclosure, another method for producing a band of retroreflective targets is provided. The method includes cutting a retroreflective material to produce a plurality of retroreflective targets, coupling each target to a first material at intervals, and depositing a layer of ink around a perimeter of each target.

In other embodiments of the present disclosure, a band of retroreflective targets is provided. The band of retroreflective targets includes a first material, a plurality of retroreflective targets coupled to the first material at intervals, and a layer of ink around a perimeter of each target.

DETAILED DESCRIPTION OF THE DISCLOSURE

The present disclosure describes a band of retroreflective targets with reduced interference from the sides of the targets. The band of retroreflective targets thus provides improved performance through, for example, improved tolerance of measuring the targets by providing more planar targets.

As used herein, the term "band" refers to a continuous band. In some embodiments, the band includes, for example, a plurality of holes. In other embodiments, the band only includes one hole and is completely separated from any other piece of the band material. In still other embodiments, the band includes no holes.

Referring first to one known method for producing bands of retroreflective targets, a retroreflective material is die-cut into the desired size of the retroreflective targets. These targets (e.g., small circles of retroreflective material) are adhered or otherwise affixed on top of a matte black tape. In some embodiments, the resulting band of targets further includes an adhesive layer and a protective liner for affixing the band to an object being photographed.

Such a band of retroreflective targets may suffer from interference from the sides of the retroreflective targets, as the retroreflective targets are raised from the tape by the depth or thickness of the retroreflective material. The reflective edges are thereby exposed and may reflect light at unexpected and undesired angles, causing distortion and interference in the resulting photographs. Such interference may increase as the angle between the light source and the target increases. Thus, such a band of targets may be less accurate than desired.

In accordance with the present disclosure, a method for producing a band of retroreflective targets is disclosed. The method includes cutting at least one hole into a first material, die-cutting a retroreflective material to create at least one retroreflective target, coupling an adhesive layer to the first material, and inserting the at least one target into a corresponding hole of the at least one hole in the first material. For example, if at least one hole is cut into the tape, then at least one retroreflective target is die-cut and placed into the at least one hole in the tape. In some embodiments, cutting at least one hole into the first material includes cutting a plurality of holes into the first material at intervals. The number of holes and number of targets used varies, without being limited. For example, in some embodiments, the number of holes is 5 and the number of targets cut is 5 and each target is placed into each one of the holes.

In accordance with the present disclosure, another method for producing a band of retroreflective targets is disclosed. The method includes cutting a retroreflective material to produce a plurality of retroreflective targets, coupling each target to a first material at intervals, and depositing a layer of ink around a perimeter of each target.

The resulting products of the present disclosure can be used in a variety of technologies, including, but not limited to, the construction/building of boats, ships, airplanes, and other vessels/modes of transportation.

The cutting and/or die-cutting is performed using any known method in the art, without departing from the scope of the present disclosure. Moreover, it should be understood that other forms of cutting may be used, such as laser cutting.

In some embodiments, the material to which the targets are attached is a tape. In some embodiments, the tape includes a polyester material. In other embodiments, the tape includes a paper material or a film. In some embodiments, the material includes a matte black material. It should be understood that where reference to the "tape" is made herein, it may further refer generally to the "first material." In some embodiments, the tape has a width of from about 0.001 mm to about 150 mm, from about 0.1 mm to about 10 mm or from about 0.5 mm to about 5 mm, as well as any ranges included therein. In some embodiments, the tape includes a height of from about 0.001 mm to about 150 mm, from about 0.1 mm to about 10 mm or from about 0.5 mm to about 5 mm, as well as any ranges included therein. In some embodiments, the tape has a depth of from about from about 0.001 mm to about 150 mm, from about 0.1 mm to about 10 mm or from about 0.5 mm to about 5 mm, as well as any ranges included therein. In some embodiments, the tape has a depth of from about 5 mm to about 10 mm.

In some embodiments, the retroreflective targets include a glass material. In some embodiments, the targets have a diameter of from about 0.001 mm to about 150 mm, from about 0.1 mm to about 10 mm, from about 1 mm to about 25 mm, or from about 0.5 mm to about 5 mm, as well as any ranges included therein, including, but not limited to about 0.06 mm, about 0.08 mm, about 0.09 mm, about 0.12 mm, about 0.16 mm, about 0.20 mm, about 0.25 mm, about 0.37 mm, about 0.39 mm, about 0.50 mm, about 0.75 mm, about 1.00 mm, about 2 mm, about 5 mm, about 7 mm, about 10 mm, about 12 mm, about 15 mm, about 20 mm, about 25 mm, about 30 mm, about 40 mm, or about 50 mm. In some embodiments, the targets have a depth of from about 0.001 mm to about 150 mm, from about 0.1 mm to about 10 mm or from about 0.5 mm to about 5 mm, as well as any ranges included therein. In some embodiments, the band of targets is part of a roll that is at least about 50 yards long. It should be understood, however, that the length of the roll varies depending upon the user's intended use of the target.

In some embodiments, multiple rows of targets are included on the same band of tape. In some embodiments, the spacing of the holes between each target and/or hole varies as well. For example, in some embodiments, the distance between each target and/or hole (when more than one hole is present) is from about 0.1 mm to about 100 mm, from about 0.5 mm to about 50 mm, from about 1 mm to about 100 mm, or from about 1 mm to about 10 mm, as well as any ranges included therein.

In some embodiments, the adhesive layer comprises a polyester material.

In some embodiments, the targets are inserted into the holes in the tape and/or are placed on and coupled to a material (e.g., a tape) through methods generally known in the art, such as, for example, island placement, by hand, or by robotics. In some preferred embodiments, the targets are placed using island placement to insert a target into a corresponding hole in the first material.

In other embodiments of the present disclosure, a band of retroreflective targets is disclosed. The band comprises a first material having a first depth, the first material including at least one hole defined therein. The band further comprises at least one retroreflective target having a second depth, wherein the second depth is equal to or substantially the same as the first depth. Each of the at least one retroreflective targets is disposed within a corresponding hole of the at least one hole in the first material. In some embodiments, the targets are disposed within a corresponding hole at intervals.

As used herein, the phrase "substantially planar" means that the targets are placed within the tape such that the top part of each target is substantially within the same plane as the top part of the tape. While in some embodiments there is a minimal amount of departure from the plane, the top face of the band comprises the targets and the holes in substantially the same plane such that improved tolerance is achieved. In some embodiments, the targets lie within about 5 mm—either above or below—of the same plane of the holes in the tape. In other embodiments, the targets lie within about 3 mm, within about 1 mm, or within about 0.5 mm—either above or below—of the same plane of the tape. In some embodiments, the targets lie equally within the depth and height of the holes in the tape, such that the targets neither appear above the tape nor appear where they do not reach the top face of the tape (which would leave a visible indent in the tape). In some embodiments, the tape covers the edges of the target in an amount of from about ±0.001 mm to about 0.010 mm. In these embodiments in which the tape covers the edges of the target(s), the maximum number of angles are still able to be read from the target(s).

As used herein, the phrase "corresponding holes" in reference to the targets means that there is one target being placed per one hole. It is not necessary, though it may occur, that, for example, a third target cut goes into a third hole. In some embodiments, there are instances when certain targets are cut and not used in a hole, but rather are discarded for various reasons. In other embodiments, if, for example, 5 holes are cut in the tape, then 5 targets will be created and one target each will be placed in one hole each (i.e., into a "corresponding" hole).

In some embodiments, the adhesive layer is coupled against the bottom face of the tape using any method known in the art.

In some embodiments, the tape has a first depth of from about 0.001 mm to about 20 mm, from about 0.01 mm to about 15 mm, from about 0.1 mm to about 10 mm, or about 1 mm.

In some embodiments, the at least one hole includes a plurality of holes. In other embodiments, the plurality of holes includes at least two, at least five, at least ten or at least one hundred holes. It should be noted, however, that the number of holes is not limited. In other embodiments, only one hole is cut in the tape, wherein the tape includes at least one hole.

In another embodiment of the present disclosure, a band of retroreflective targets is disclosed. The band of retroreflective targets includes a first material, a plurality of retroreflective targets coupled to the first material at intervals, and a layer of ink around a perimeter of each target.

In some embodiments, the layer of ink is printed onto each individual target. In some embodiments, the layer of ink is integrally formed with each individual target (i.e., is not deposited thereon in a separate processing step).

In some embodiments, each target has a first diameter defined by the layer of ink and a second diameter larger than the first diameter defined by the perimeter of the respective target. That is, the layer of ink at least partially obstructs at least a portion a face of the target, as well as a side wall of the target. In some embodiments, the layer of ink partially obstructs an entirety of at least one side wall of the target.

In some embodiments, multiple rows of targets are included on the same band of tape. In some embodiments, the spacing between each target varies, and/or the targets may be evenly spaced, for example, in a two-dimensional array. In some embodiments, one or more cuts (e.g., slits) are made in the band to separate individual targets and/or rows/columns of targets (and the corresponding material to which the targets are coupled) from the overall band. In some embodiments, the cuts are straight or linear, curved, or have a zig-zag pattern. In some embodiments, a zig-zag pattern improves the "tearability" of the first material, such that the band may be torn by hand.

Referring now to the drawings and in particular to FIG. 1, a flow-chart of an exemplary method 10 in accordance with the present disclosure for producing a band of retroreflective targets is shown. The method 10 includes cutting 12 at least one hole into a first material. In some embodiments, the first material is a matte black tape that is relatively non-reflective (relative to the object being photographed and/or the retroreflective targets). The method 10 further includes die-cutting 14 a retroreflective material to create at least one retroreflective target. In some embodiments, the retroreflective targets are cut, for example, from a continuous sheet or band of the retroreflective material. As described further herein, in some embodiments, the targets are die-cut to have a circular shape or are die-cut to have any other suitable shape. It should be understood that any reference to "die-cut" or "die-cutting" herein is not meant to be limiting, and may include any suitable method of cutting materials, not limited to the use of dies. In some embodiments, the die-cutting produces a waste material. In some embodiments, the method includes removing the waste material produced by the die-cutting.

The method 10 further includes coupling 16 an adhesive layer to the first material. In some embodiments, the adhesive layer is adhered or otherwise affixed to the first material on a "tape face" of the adhesive layer. Accordingly, the adhesive layer includes the tape face (adhered to the first material) and a free face opposite the tape face. The tape face of the adhesive layer includes "free" or un-adhered regions corresponding to each hole in the first material, wherein the adhesive is unobstructed. In some embodiments, the adhesive layer further includes a protective liner, which is configured to couple against and cover the free face of the adhesive layer. In some embodiments, the protective liner is coupled to the free face of adhesive layer in a subsequent step of the method 10 that comprises attaching the liner to the adhesive layer.

The method 10 further includes inserting 18 the at least one retroreflective target into a corresponding hole of the at least one hole in the material, such that each hole receives one target. Moreover, inserting 18 includes adhering each retroreflective target to a corresponding free, unobstructed region of the adhesive layer.

Figure 2:
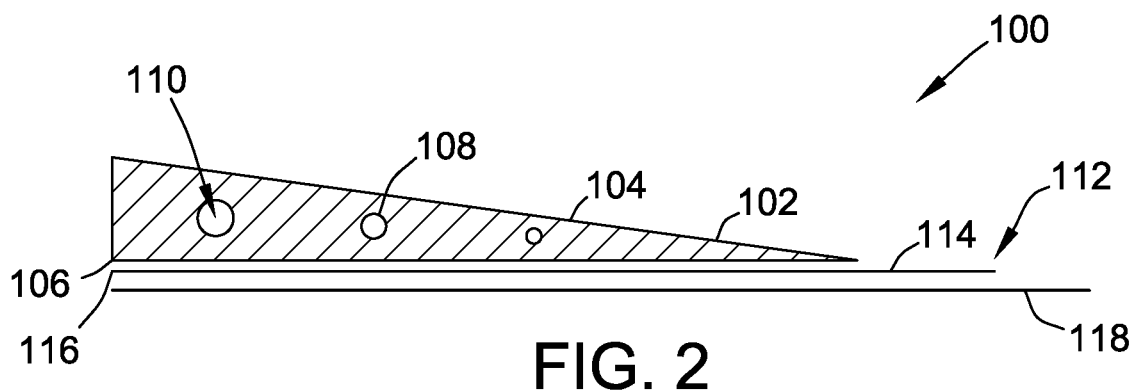
FIG. 2 is a perspective, cross-sectional view of an exemplary band of retroreflective targets produced in accordance with the present disclosure.
Figure 3:
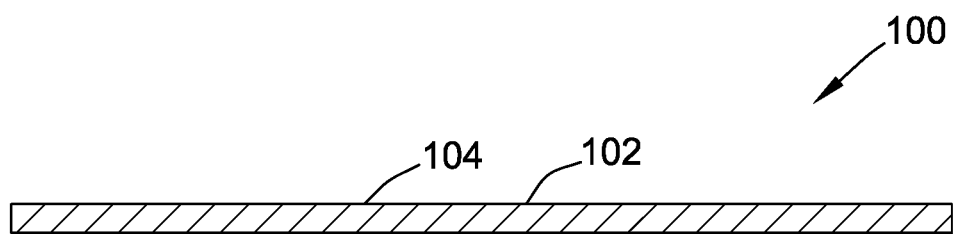
FIG. 3 is a cross-sectional view of an exemplary band of retroreflective targets in accordance with the present disclosure.
Figure 4:
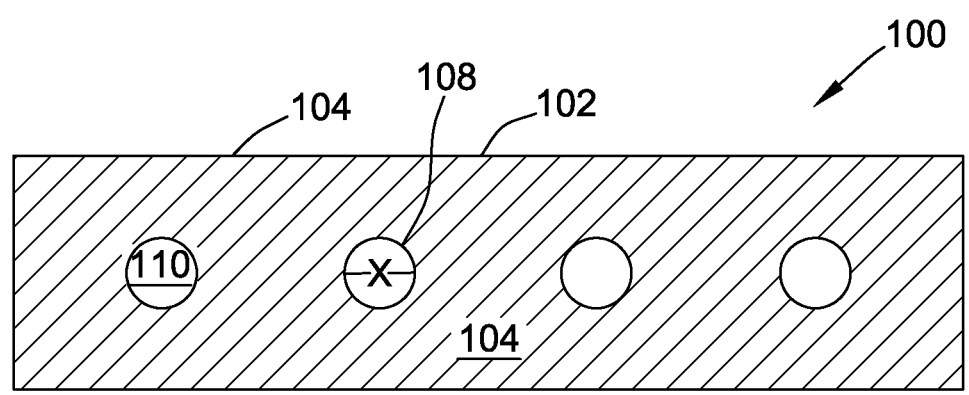
FIG. 4 is a top view of an exemplary band of retroreflective targets in accordance with the present disclosure.

Referring generally to FIGS. 2-4, an exemplary band of retroreflective targets produced according to the present disclosure is indicated generally at numeral 100. The band 100 includes a top face 102. The band 100 also includes a matte black tape 104 (e.g., a first material). In some embodiments, the tape 104 includes polyester. The tape 104 includes a bottom face 106. The tape 104 is cut (e.g., die-cut) to include a plurality of holes 108 defined therein. The holes 108 are spaced at particular intervals, such that each adjacent hole 108 is equidistant from the next, as best illustrated in FIG. 4.

In some embodiments, the holes 108 are of any desired size such that a diameter X of each hole 108 corresponds to a desired diameter of each retroreflective target 110 positioned within each hole 108. For example, for a band 100 of retroreflective targets 110 that are 3 mm in diameter, each hole 108 is about 3 mm in diameter. Moreover, the tape 104 is of any desired width, such that the tape 104 accommodates retroreflective targets 110 of a desired diameter. In other words, the width of the tape 104 is chosen according to the desired size of the targets 110. As used herein, "about" refers generally to manufacturing tolerances and standards. In some embodiments, the difference between the size of the hole diameter and the target diameter is from about 0.01 mm to about 0.05 mm, or about 0.03 mm. In some embodiments, the size difference between the hole and the target is such that either the target or the hole is bigger, such that the difference between the size of the hole diameter and the size of the target diameter is ±about 0.01 mm to about 0.05 mm.

In some embodiments, each of the retroreflective targets 110 is die-cut from a continuous sheet or a band of retroreflective material (not shown). In some embodiments, the targets 110 are die-cut in a circular shape. In other embodiments, the targets 110 have any other suitable shape. The targets 110 are cut to any desired size. Accordingly, there is little to no waste of retroreflective material, as only the exact amount, or about the exact amount, needed to produce to the retroreflective targets 110 is cut and used.

In some embodiments, the band 100 further includes an adhesive layer 112. In some embodiments, the adhesive layer 112 is made of any suitable material such that the band 100 is adhered to an object (not shown) during use. The adhesive layer 112 includes a tape face 114 and a free face 116 opposite the tape face 114. The adhesive layer 112 is coupled against (e.g., adhered to) the bottom face 106 of the tape 104, and at least one retroreflective target 110 is coupled to the adhesive layer 112. In regions of the adhesive layer 112 corresponding to the holes 108 in the tape 104, the adhesive layer 112 is coupled against (e.g., adhered to) one of the retroreflective targets 110 disposed in the hole 108, such that the targets 110 are fixed in place relative to the tape 104. In some embodiments, the band 100 further includes a protective liner 118 coupled against (e.g., adhered to) the free face 116 of the adhesive layer 112. The protective liner 118 is configured to ensure that during shipping and display, the band 100 does not adhere to itself and/or to any packaging (not shown). The protective liner 118 is further configured to be easily de-coupled from the adhesive layer 112 upon application of a pulling force to the protective liner 118 away from the adhesive layer 112. Accordingly, in some embodiments, the protective liner 118 is removed from the band 100, and the band 100 is adhered to an object to be photographed.

In some embodiments, the tape 104 has a depth substantially the same as (i.e., within manufacturing tolerance of) a depth of the retroreflective material from which the retroreflective targets 110 are cut.

FIG. 3 shows a side view of an exemplary band 100 of retroreflective targets shown in FIG. 2. As shown, the top face 102 of the band 100 is substantially planar. By preparing the band 100 as described with respect to FIG. 1, and by selecting the tape 104 and the retroreflective targets 110 to have substantially the same depth, any discrepancy between a top face of the tape 104 and a top face of the targets 110 is substantially reduced or eliminated. Accordingly, the obstruction from any depth of the tape 104 extending over the retroreflective targets 110 is substantially reduced or eliminated, as is any interference created by any depth of the targets 110 extending over the tape 104.

Figure 5:
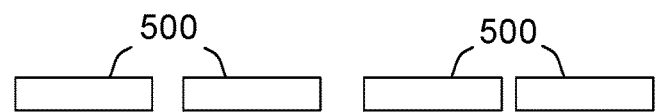
FIG. 5 is a cross-sectional side view of a plurality of retroreflective targets.

FIG. 5 is a cross-sectional side view of a plurality of retroreflective targets 500. In some embodiments, targets 500 are similar to targets 110 (shown in FIGS. 2-4). In some embodiments, targets 500 are cut (e.g., die-cut) from a continuous sheet of retroreflective material. Targets 500 all have substantially the same dimensions.

Figure 6:
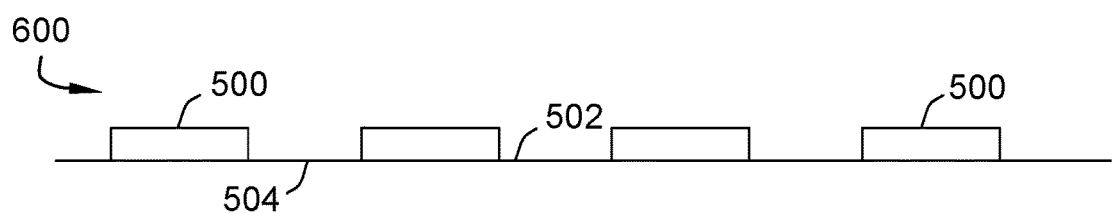
FIG. 6 is a cross-sectional view of the retroreflective targets shown in FIG. 5 coupled to a material to form a band of retroreflective targets.

FIG. 6 is a cross-sectional view of the retroreflective targets 500 (shown in FIG. 5) coupled to a material 502 to form a band of retroreflective targets 600. The targets 500 are adhered to the material 502, for example, using an adhesive material located between the material 502 and each target, wherein the adhesive material couples each target to the material 502. Alternatively, the targets 500 are coupled to the material 502 using any other coupling method. In the illustrated embodiment, the targets 500 are coupled to material 502 at fixed intervals or at a "predefined pitch", such that the targets 500 are equally spaced from one another. In some embodiments, the coupling includes transferring each target onto the material 502 at the predefined pitch and adhering each target to the material 502. In some embodiments, the targets 500 are spaced from one another by about 1 mm to about 100 mm, from about 2 mm to about 50 mm, from about 5 mm to about 25 mm, or about 10 mm. It should be understood that in other embodiments, one or more targets 500 are other than evenly spaced from one or more adjacent targets 500.

In some embodiments, the material 502 is a matte black material. In other embodiments, the material 502 is any other suitable material for coupling the targets 500 thereto and/or for affixing to an object to be photographed. For example, in some embodiments, the material 502 has an adhesive bottom face 504. Alternatively, a separate adhesive (not shown) is coupled to the bottom face 504 of the material 502.

Figure 7:
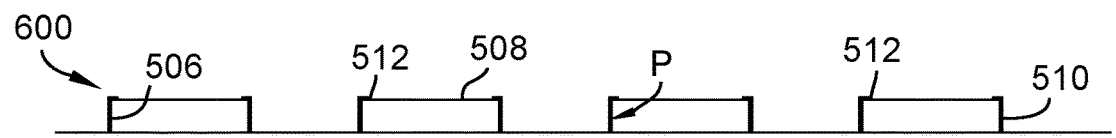
FIG. 7 is a cross-sectional view of the band of retroreflective targets shown in FIG. 6 including ink deposited around a perimeter of the targets.

FIG. 7 is a cross-sectional view of the band of retroreflective targets 600 (shown in FIG. 6) including a layer of ink 510 deposited around a perimeter P of the targets 500 (shown in FIG. 5). In the illustrated embodiment, the layer of ink 510 surrounds the perimeter P of the targets 500. More specifically, the layer of ink 510 covers a side wall 506 of the targets 500 as well as a portion of a top face 508 of the targets. Accordingly, depositing the layer of ink 510 onto the targets 500 as shown eliminates interference from the side walls 506 of the targets 500 when the targets 500 are in use.

In the illustrated embodiment, the layer of ink 510 is printed onto the targets 500. However, it should be understood that the layer of ink 510 is deposited on the targets 500 using any other method and/or is integrally formed with the targets 500. In some embodiments, the targets 500 are registered or identified, for example, using a high-speed camera (not shown) to track the precise location of each target 500 on the material 502. In at least one preferred embodiment, the layer of ink 510 is then deposited in a precise and regular manner onto the targets 500, such that the same amount of the top face 508 of every target 500 is covered by the layer of ink 510. Accordingly, a visible edge 512 of the top face 508 of each target 500 is equidistant from the visible edge 512 of the top face 508 of the adjacent target 500. Moreover, the respective top faces 508 of the targets 500 are in substantially the same plane as one another. This embodiment of the band 600 ensures that each target 500 will be identified or registered by photogrammetry equipment with accurate measurements between adjacent targets 500.

As used herein, the phrase "substantially the same plane" means that the top face of the targets are within the same plane, with a minimal amount of departure from the plane, such that improved tolerance is achieved. In some embodiments, the top face of the targets are within about 5 mm —either above or below— of the same plane. In other embodiments, the top face of the targets are within about 3 mm, within about 1 mm, or within about 0.5 mm—either above or below—of the same plane.

Figure 8:
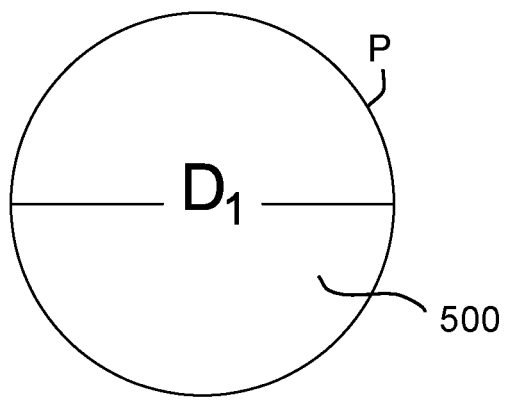
FIG. 8 is a top view of an exemplary retroreflective target shown in FIG. 5.

FIG. 8 is a top view of an exemplary retroreflective target 500 (shown in FIG. 5). The target 500 has a first diameter $D_1$, measured with respect to the perimeter P of the target 500. In other words, $D_1$ is the actual physical diameter of the target 500.

Figure 9:
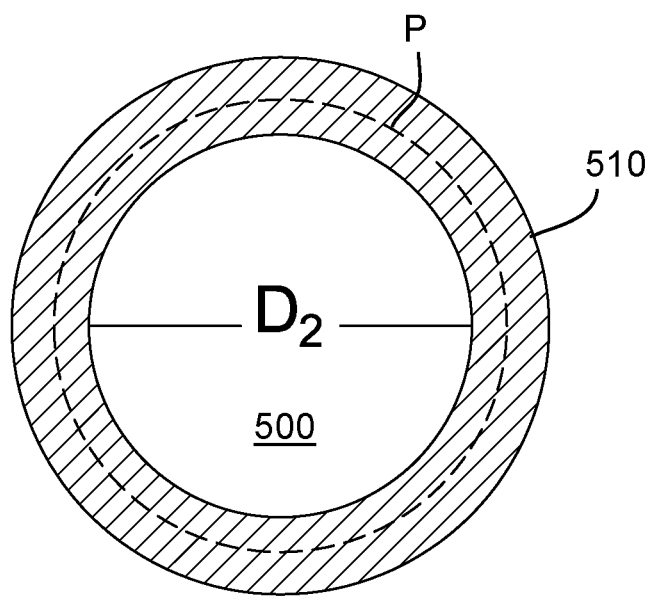
FIG. 9 is a top view of the retroreflective target shown in FIG. 8, with a layer of ink deposited around a perimeter thereof, as shown in FIG. 7.

FIG. 9 is a top view of the same retroreflective target 500 shown in FIG. 8, with the layer of ink 510 (shown in FIG. 7) deposited around the perimeter P thereof. As shown, depositing the layer of ink 510 reduces a "visible diameter" of the top face 508 of the target 500 to a second diameter $D_2$. The diameter $D_2$ is defined by the layer of ink 510, and how much of the top face 508 of the target 500 is covered by the layer of ink 510. In some embodiments, the second diameter $D_2$ is smaller than diameter $D_1$ by about 0.01 mm to about 5 mm, or by about 0.05 mm to about 2 mm, or by about 0.1 mm.

Figure 10:
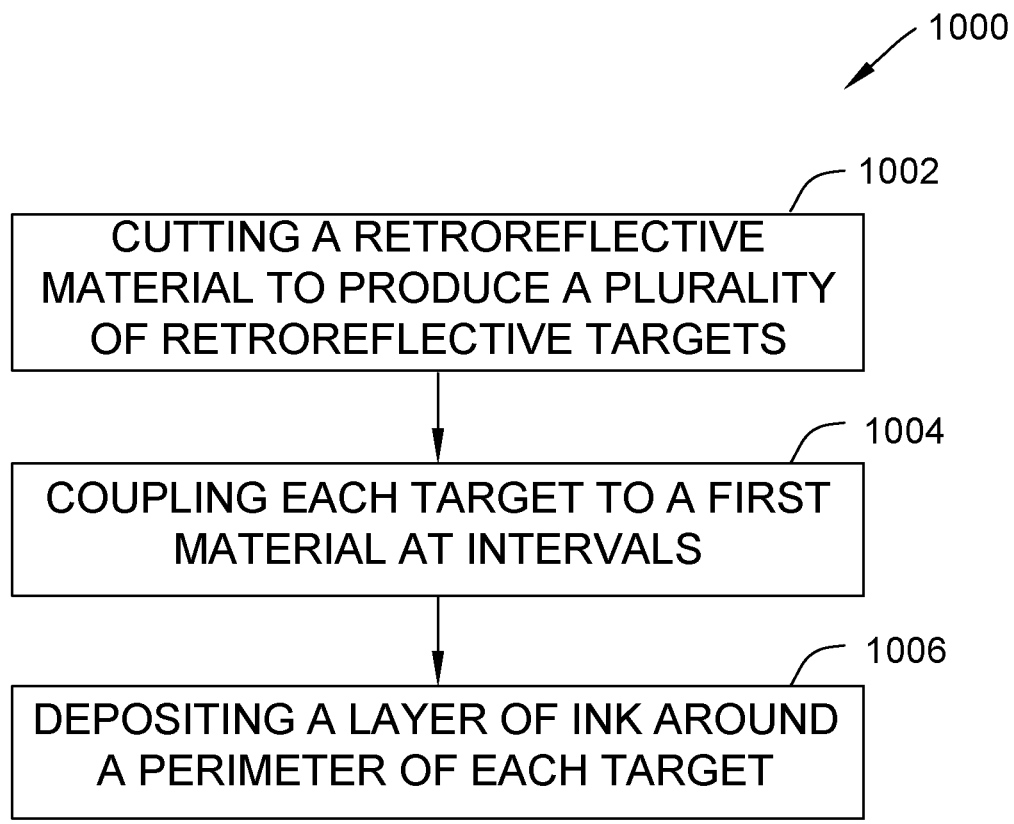
FIG. 10 is a flow-chart of another exemplary method for producing a band of retroreflective targets in accordance with the present disclosure.

FIG. 10 is a flow-chart of another exemplary method 1000 for producing a band of retroreflective targets (e.g., band 600, shown in FIG. 7) in accordance with the present disclosure. The method 1000 includes cutting 1002 a retroreflective material to produce a plurality of retroreflective targets (e.g., targets 500, shown in FIGS. 5-9). The method 1000 also includes coupling 1004 each target to a first material (e.g., material 502, shown in FIGS. 6 and 7) at intervals. The method 1000 further includes depositing 1006 a layer of ink (e.g., layer of ink 510, shown in FIGS. 7 and 9) around a perimeter (e.g., perimeter P, shown in FIG. 7) of each target.

It should be understood that the band 100 has different configurations, shapes, and sizes than those illustrated and described herein without departing from the present disclosure.

When introducing elements of the present disclosure or the embodiment(s) thereof, the articles "a", "an", "the" and "said" are intended to mean that there are one or more of the elements. The terms "comprising", "including" and "having" are intended to be inclusive and mean that there may be additional elements other than the listed elements. Like references in the figures indicate like elements, unless otherwise indicated.

As various changes could be made in the above without departing from the scope of the disclosure, it is intended that all matter contained in the above description and shown in the accompanying drawings shall be interpreted as illustrative and not in a limiting sense.

What is claimed is:

1. A method for producing a band of retroreflective targets, the method comprising:
   cutting at least one hole into a matte first material;
   die-cutting a retroreflective material to create at least one retroreflective target;
   coupling an adhesive layer to the first material; and
   inserting the at least one target into a corresponding hole of the at least one hole in the first material.

2. The method of claim 1, further comprising attaching a liner to the adhesive layer.

3. The method of claim 1, wherein cutting at least one hole into the first material comprises cutting a plurality of holes into the first material at intervals.

4. The method of claim 1, wherein inserting the at least one target into a corresponding hole of the at least one holes in the first material comprises using island placement to insert the at least one target into the corresponding hole of the at least one holes of the first material.

5. The method of claim 1, wherein die-cutting the retroreflective material comprises:
   die-cutting a plurality of retroreflective targets from a band of the retroreflective material, wherein the die-cutting produces a waste material; and
   removing the waste material produced by the die-cutting.

6. A band of retroreflective targets comprising:
   a matte first material having a first depth, the first material including at least one hole defined therein; and
   at least one retroreflective target having a second depth, wherein the second depth is equal to or substantially the same as the first depth,
   wherein each of the at least one retroreflective targets is disposed within a corresponding hole of the at least one holes in the first material.

7. The band of retroreflective targets of claim 6, further comprising an adhesive layer coupled to a bottom face of the first material, wherein the at least one retroreflective target is coupled to the adhesive layer.

8. The band of retroreflective targets of claim 7, further comprising a liner coupled to the adhesive layer.

9. The band of retroreflective targets of claim 6, wherein the at least one target is disposed within a corresponding hole of the at least one holes of the first material at intervals.

10. A method for producing a band of retroreflective targets, the method comprising:
    cutting a retroreflective material to produce a plurality of retroreflective targets;
    coupling each target to a first material at intervals; and
    depositing a layer of ink around a perimeter of each target, wherein the perimeter of each target includes a side wall of each target and a portion of a top face of each target.

11. The method of claim 10, further comprising registering each target prior to depositing the ink.

12. The method of claim 10, wherein the depositing of the ink reduces a visible diameter of each target.

13. The method of claim 10, wherein the coupling comprises:
    transferring each target onto the first material at a predefined pitch; and
    adhering each target to the first material.

14. The method of claim 10, wherein coupling each target to a first material at intervals comprises coupling the plurality of retroreflective targets to the first material in a two-dimensional array, said method further comprising slitting the first material in a zig-zag pattern such that the first material is hand-tearable.

15. A band of retroreflective targets comprising:
    a first material;
    a plurality of retroreflective targets coupled to the first material at intervals; and
    a layer of ink around a perimeter of each target, wherein the perimeter of each target includes a side wall of each target and a portion of a top face of each target.

16. The band of retroreflective targets of claim 15, wherein the top face of each target comprises a first diameter defined by the layer of ink and a second diameter larger than the first diameter defined by the side wall of the respective target.

17. The band of retroreflective targets of claim 15, wherein the plurality of retroreflective targets are coupled to the first material in a two-dimensional array, and wherein the first material is slit in a zig-zag pattern such that the first material is hand-tearable.

18. The band of retroreflective targets of claim 15, further comprising an adhesive material between the first material and each target, wherein the adhesive material couples each target to the first material.

19. The method of claim 1, wherein inserting the at least one target into a corresponding hole of the at least one holes comprises inserting the at least one target into the corresponding hole of the at least one holes such that a top surface of the at least one target is substantially co-planar with a top surface of the first material.

20. The band of retroreflective targets of claim 1, wherein a top surface of the at least one retroreflective target is substantially co-planar with a top surface of the first material.

\* \* \* \* \*